(12) United States Patent
Yoshinaga et al.

(10) Patent No.: US 11,277,083 B2
(45) Date of Patent: Mar. 15, 2022

(54) MOTOR

(71) Applicant: NIDEC CORPORATION, Kyoto (JP)

(72) Inventors: Masaki Yoshinaga, Kyoto (JP);
Tomohiro Fukumura, Kyoto (JP);
Taro Amagai, Kyoto (JP); Akiko Ikeda, Kyoto (JP); Kengo Araki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/835,315

(22) Filed: Mar. 31, 2020

(65) Prior Publication Data

US 2020/0321895 A1 Oct. 8, 2020

(30) Foreign Application Priority Data

Apr. 4, 2019 (JP) .............................. JP2019-072003

(51) Int. Cl.
*H02P 6/16* (2016.01)
*H02K 29/08* (2006.01)

(52) U.S. Cl.
CPC .............. *H02P 6/16* (2013.01); *H02K 29/08* (2013.01)

(58) Field of Classification Search
CPC .................................. H02K 29/08; H02P 6/16
USPC .................................................... 318/400.38
See application file for complete search history.

(56) References Cited

U.S. PATENT DOCUMENTS

| 2005/0127902 | A1* | 6/2005 | Sogge | G01D 3/08 324/207.2 |
| 2007/0247141 | A1* | 10/2007 | Pastre | G01R 33/075 324/202 |
| 2010/0007340 | A1* | 1/2010 | Kaita | G01D 5/2449 324/207.25 |
| 2010/0026282 | A1* | 2/2010 | Kaita | G01B 7/30 324/207.25 |
| 2015/0040687 | A1* | 2/2015 | Ariyama | G01R 33/02 73/862.381 |
| 2017/0248662 | A1* | 8/2017 | Santos | G01R 33/0029 |

FOREIGN PATENT DOCUMENTS

JP 2012-47630 A 3/2012
JP 2012047630 A * 3/2012

* cited by examiner

*Primary Examiner* — Jorge L Carrasquillo
(74) *Attorney, Agent, or Firm* — Hauptman Ham, LLP

(57) ABSTRACT

A motor according to a disclosed embodiment includes: a first magnetic sensor that detects a rotational position of a rotor; a second magnetic sensor arranged at a rotation center of the rotor; a signal amplifier that amplifies a difference between a first signal, which is a signal output from the first magnetic sensor, and a second signal which is a signal output from the second magnetic sensor; and a pulse signal generation unit that converts an output signal of the signal amplifier into a pulse signal.

2 Claims, 13 Drawing Sheets

MOTOR

CROSS-REFERENCE TO RELATED APPLICATIONS

The present invention claims priority under 35 U.S.C. § 119 to Japanese Application No. 2019-072003 filed on Apr. 4, 2019, the entire content of which is incorporated herein by reference.

FIELD OF THE INVENTION

The present disclosure relates to a motor.

BACKGROUND

Conventionally, there has been known a circuit that cancels an output offset for a magnetic sensor, such as a Hall element, that changes according to the magnitude of a magnetic force. For example, there has been known an offset cancellation circuit of a Hall element configured to cancel an offset caused by a parasitic capacitance of a capacitor in a circuit.

Meanwhile, a Hall element is widely used as a magnetic sensor to detect a position of a rotor in a motor. A signal of the Hall element is amplified by a signal processing circuit, supplied to a microcontroller, and used for control of motor driving. Here, if an external magnetic field, such as a permanent magnet, is brought close to the motor, an offset occurs in the signal from the magnetic sensor, so that there is a problem that the signal of the Hall element is not accurately transmitted to the microcontroller. However, conventionally, a method for removing the offset caused by the external magnetic field has not been known.

SUMMARY

An exemplary embodiment of the present disclosure is a motor including: a first magnetic sensor that detects a rotational position of a rotor; a second magnetic sensor arranged at a rotation center of the rotor; a signal amplifier that amplifies a difference between a first signal, which is a signal output from the first magnetic sensor, and a second signal which is a signal output from the second magnetic sensor; and a pulse signal generation unit that converts an output signal of the signal amplifier into a pulse signal.

The above and other elements, features, steps, characteristics and advantages of the present disclosure will become more apparent from the following detailed description of the preferred embodiments with reference to the attached drawings.

DETAILED DESCRIPTION

Hereinafter, a motor drive system which is an embodiment of a drive system of the present disclosure will be described.

In the following embodiments, a configuration including at least a three-phase AC motor, a plurality of Hall elements, and a signal processing circuit of each Hall element corresponds to a motor of the present disclosure.

Hereinafter, an embodiment of a motor drive system of the present disclosure will be described with reference to the drawings.

Figure 1:
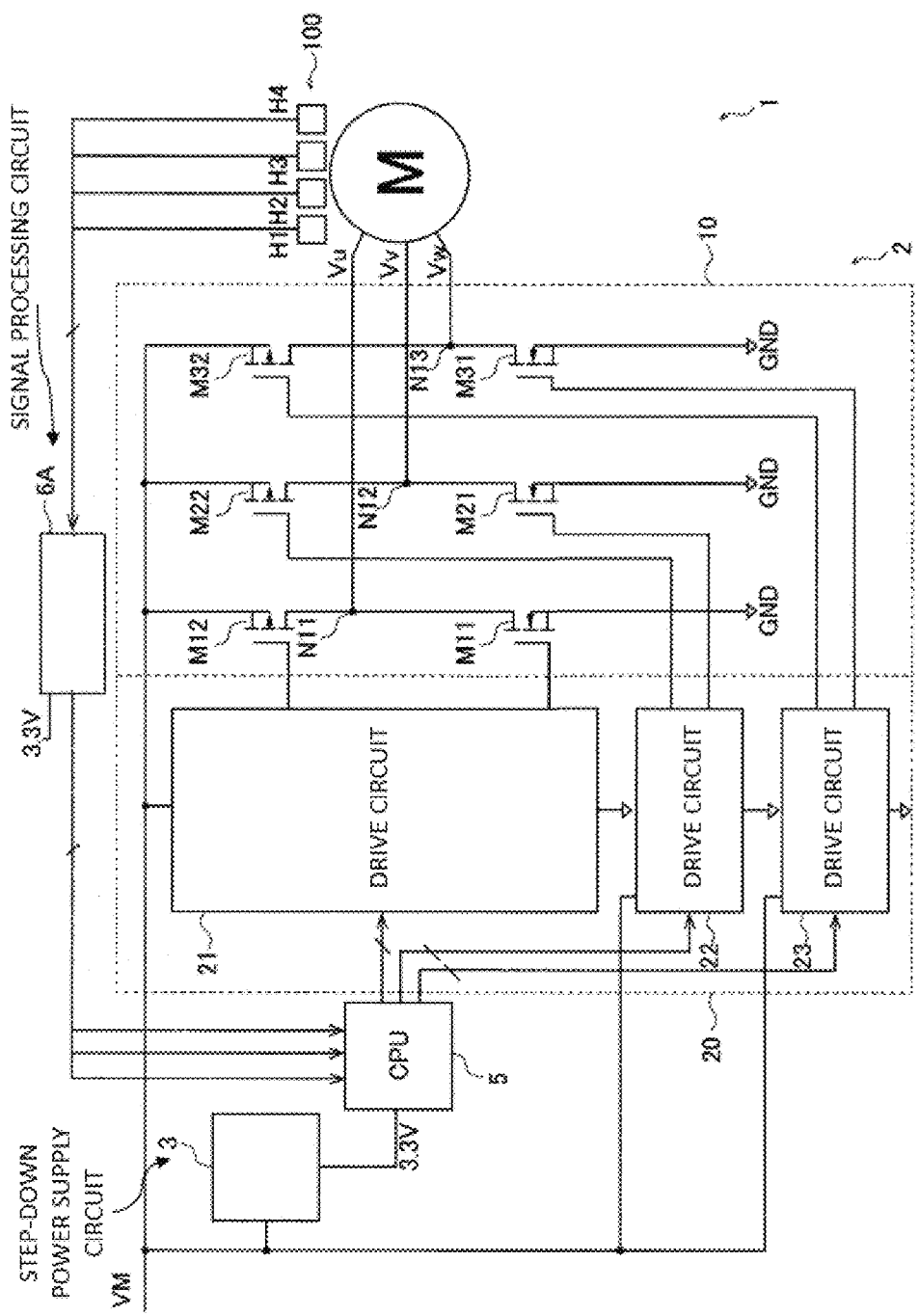
FIG. 1 is a diagram showing a system configuration of a motor drive system according to a first embodiment.

FIG. 1 is a diagram showing a system configuration of a motor drive system 1 according to the embodiment. The motor drive system 1 includes an inverter device 2, a step-down power supply circuit 3, a central processing unit (CPU) 5, and a three-phase AC motor M. The CPU 5 is an example of a microcontroller.

The inverter device 2 includes a three-phase voltage generation unit 10 and a drive circuit group 20, generates three-phase AC power, and supplies the three-phase AC power to a three-phase AC motor M. The three-phase AC motor M is provided with a Hall element group 100 for each phase for detecting a position of a rotor.

In the following description, a voltage of a node or a terminal in a circuit means a potential with a ground potential GND (hereinafter, referred to as a "GND potential") as a reference. For example, the highest potential in the inverter device 2 is a power supply potential VM, but the GND potential may be regarded as 0 V, and accordingly, is also referred to as "power supply voltage VM" as appropriate.

The step-down power supply circuit 3 reduces the power supply voltage VM to a predetermined voltage (+3.3 V in the present embodiment) required for the operation of the CPU 5, and supplies the power supply voltage VM to the CPU 5.

The CPU 5 supplies a pulse signal having an amplitude of 3.3 V to each of drive circuits 21 to 23 of the drive circuit group 20. Each drive circuit converts the pulse signal from the CPU 5 to a signal level at which a MOS transistor in the three-phase voltage generation unit 10 can operate.

In FIG. 1, the drive circuits 21 to 23 respectively correspond to nodes N11 to N13 and correspond to output terminals of a drive circuit to be described below.

Hereinafter, the configuration of the inverter device 2 will be described in detail.

As shown in FIG. 1, the three-phase voltage generation unit 10 of the inverter device 2 includes NMOS transistors M11, M21, and M31 as low-side switches and PMOS transistors M12, M22, and M32 as high-side switches. Since the three-phase AC motor M may operate at 100% duty in some cases, the three-phase voltage generation unit 10 uses the high-side switch as the PMOS transistor.

In the present embodiment, the PMOS transistor M12 and the NMOS transistor M11 are provided for a U phase of three-phase AC power supplied to the three-phase AC motor M. The PMOS transistor M12 and the NMOS transistor M11 perform the switching operation to generate a U-phase voltage Vu which is a U-phase output voltage.

Similarly, the PMOS transistor M22 and the NMOS transistor M21 are provided for a V phase of the three-phase AC power supplied to the three-phase AC motor M. The PMOS transistor M22 and the NMOS transistor M21 perform the switching operation to generate a V-phase voltage Vv which is a V-phase output voltage. The PMOS transistor M32 and the NMOS transistor M31 are provided for a W phase of the three-phase AC power supplied to the three-phase AC motor M. The PMOS transistor M32 and the NMOS transistor M31 perform the switching operation to generate a W-phase voltage Vw which is a W-phase output voltage.

Each of the NMOS transistors M11, M21, and M31 has a source set to the ground potential GND. Each of the PMOS transistors M12, M22, M32 has a source connected to the power supply voltage VM of the inverter device 2.

A common drain (the node N11) of the NMOS transistor M11 and the PMOS transistor M12 of the U phase is connected to one end of a U-phase winding (not shown) of the three-phase AC motor M. Similarly, a common drain (the node N12) of the NMOS transistor M21 and the PMOS transistor M22 of the V phase is connected to one end of a V-phase winding (not shown) of the three-phase AC motor M, and a common drain (the node N13) of the NMOS transistor M31 and the PMOS transistor M32 of the W phase is connected to one end of a W-phase winding (not shown) of the three-phase AC motor M.

The Hall element group 100 includes four Hall elements H1, H2, H3, and H4. In the following description, when the four Hall elements H1, H2, H3, and H4 will be simply described as "Hall elements H" when being commonly referred to. The Hall elements H1 to H3 are elements that detect a position of a rotor magnet of the three-phase AC motor M, and are elements that convert the magnitude of a magnetic force that changes in accordance with the rotation of the rotor magnet (also simply referred to as a "rotor" as appropriate) of the three-phase AC motor M into an electric signal. The Hall element H4 is arranged at a rotation center of the rotor, and is provided to detect a component generated by an external magnetic field.

Signals of the three Hall elements H1, H2, and H3 are complementary signals each of which is a pair of signals inverted from each other with respect to a reference voltage, are sine wave signals having a phase difference of 120 degrees in order, and correspond to the U phase, the V phase, and the W phase, respectively. The Hall element H4 is also complementary signals which are a pair of signals inverted from each other with respect to the reference voltage, but is not affected by a magnetic field accompanying the rotation of the rotor, and outputs a signal corresponding to the external magnetic field.

A signal processing circuit 6A amplifies a signal of each Hall element H, converts the signal into a pulse signal having an amplitude of 3.3 V, and supplies the pulse signal to the CPU 5. Details of the signal processing circuit 6A will be described below. A duty ratio of the pulse signal supplied from the signal processing circuit 6A is usually 50%, and does not largely deviate from 50%.

The CPU 5 determines the duty ratio of the pulse signal supplied to the driving circuits 21 to 23 of the drive circuit group 20 based on the pulse signal to be supplied by the signal processing circuit 6A, and supplies the pulse signal with the determined duty ratio to each drive circuit. The amplitude of the pulse signal to be supplied to each drive circuit is 3.3 V, which is the same as an operating voltage of the CPU 5.

Each drive circuit of the drive circuit group 20 converts a level of the pulse signal from the CPU 5 having the amplitude of 3.3 V, and inputs the converted pulse signal to a gate of the PMOS transistor and a gate of the NMOS transistor of the three-phase voltage generation unit 10. The drive circuit 21 inputs the level-converted pulse signal to each gate of the NMOS transistor M11 and PMOS transistor M12 of the U phase. The drive circuit 22 inputs the level-converted pulse signal to each gate of the NMOS transistor M21 and PMOS transistor M22 of the V phase. The drive circuit 23 inputs the level-converted pulse signal to each gate of the NMOS transistor M31 and PMOS transistor M32 of the W phase.

The operations of the NMOS transistors M11, M21, and M31 as the low-side switches and the PMOS transistors M12, M22, and M32 as the high-side switches are controlled by the pulse signals whose levels have been converted by the drive circuits 21, 22, and 23, respectively.

Hereinafter, the configuration of the signal processing circuit 6A of the present embodiment will be described in detail, but a reference circuit 6R, which is a signal processing circuit for reference, will be described with reference to FIGS. 2 and 3 first for the purpose of comparison with the signal processing circuit 6A.

Figure 2:
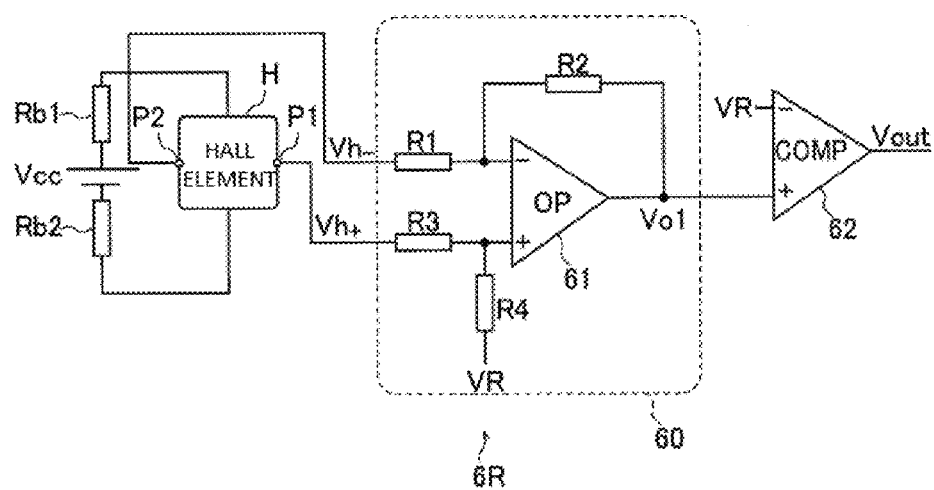
FIG. 2 is a circuit diagram of a reference circuit.
Figure 3A:
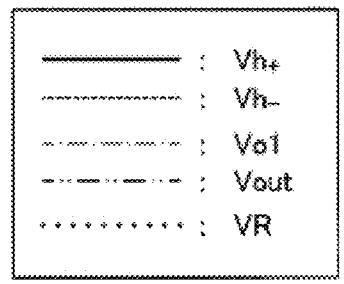
FIGS. 3A and 3B are timing charts showing the operation of the reference circuit.
Figure 3A:
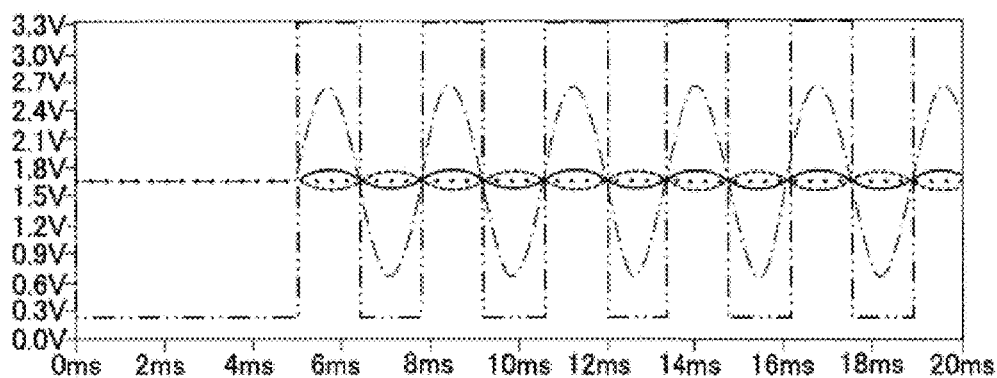
Figure 3B:
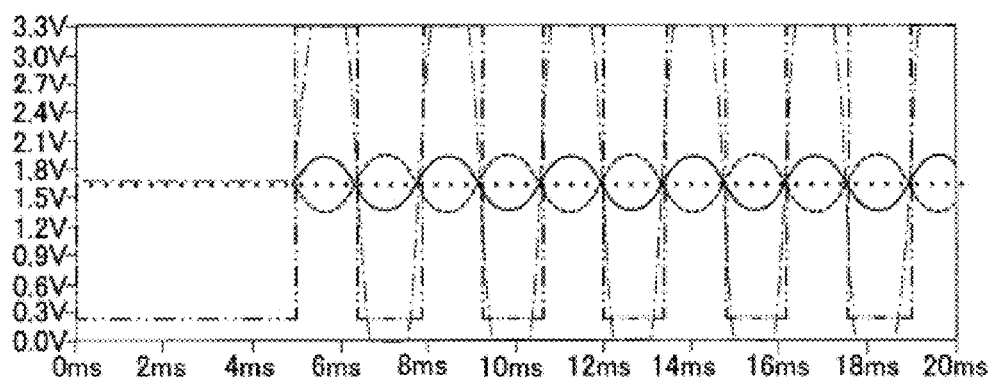

FIG. 2 is a circuit diagram of the reference circuit 6R. FIGS. 3A and 3B are timing charts showing the operation of the reference circuit 6R. Although a signal processing circuit for one Hall element H in the Hall element group 100 is shown in the reference circuit 6R shown in FIGS. 3A and 3B, a signal processing for the Hall element H of another phase is the same.

As shown in FIGS. 3A and 3B, in order to generate a predetermined bias voltage or bias current for the Hall element H, resistors Rb1 and Rb2 are provided for a power supply voltage Vcc. A pair of complementary signals, that is, a Hall element signal Vh− and a Hall element signal Vh+ are output from output terminals P1 and P2 of the Hall element H, respectively. The Hall element signal Vh+ and the Hall element signal Vh− are sine wave signals having phases opposite to each other with respect to the reference voltage VR (that is, signals having different polarities with respect to the reference voltage VR).

In the example of the present embodiment, the reference voltage VR is a voltage of a half level of the power supply voltage Vcc.

The reference circuit 6R includes a signal amplifier 60 and a comparator 62. The signal amplifier 60 includes a differential amplifier 61 and resistors R1 to R4.

The differential amplifier 61 is a differential amplifier, amplifies the signals Vh+ and Vh− of the Hall element H, and outputs a signal of a voltage Vo1. The resistor R1 is provided between the output terminal P2 of the Hall element H and an inverting input terminal of the differential amplifier 61, and the resistor R3 is provided between the output terminal P1 of the Hall element H and a non-inverting input terminal of the differential amplifier 61.

A feedback resistor R2 is provided between the inverting input terminal and an output terminal of the differential amplifier 61. One end of the resistor R4 is connected to the non-inverting input terminal of the differential amplifier 61, and the other end of the resistor R4 is set to the reference voltage VR.

Typically, the signal amplifier 60 is set such that R2/R1=R4/R3, and this value becomes an amplification factor (gain) of the signal amplifier 60.

The comparator 62 (an example of a pulse signal generation unit) compares the signal (output voltage Vo1) amplified and output by the signal amplifier 60 and the reference voltage VR, and outputs a binary pulse signal (output voltage Vout) indicating a result of the comparison. This pulse signal is supplied to the CPU 5.

FIGS. 3A and 3B show simulation results of waveforms of the Hall element signals Vh+ and Vh−, the output voltage Vo1 of the differential amplifier 61, the output voltage Vout of the comparator 62, and the reference voltage VR. FIG. 3A shows a case where the amplitude of the Hall element signal is 0.2 Vp-p and the gain of the signal amplifier 60 is five times. FIG. 3B shows a case where the amplitude of the Hall element signal is 0.6 Vp-p and the gain of the signal amplifier 60 is five times.

When the output voltage Vo1 is Vp-p and exceeds the power supply voltage Vcc (3.3 V) as shown in FIG. 3B, the output voltage Vo1 is clamped and does not become a sine wave. In both the cases of FIGS. 3A and 3B, the output voltage Vout has a pulse waveform with a 50% duty.

FIGS. 3A and 3B show a case where the reference circuit 6R operates normally. However, when there is a magnetic field other than a detection target outside, an offset occurs in the Hall element signals Vh+ and Vh−, so that the output voltage Vout does not have a 50% duty. This point is shown in FIG. 4.

Figure 4:
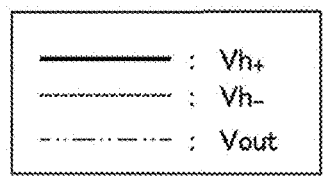
FIG. 4 is a view for describing an effect of an external magnetic field on a signal of a Hall element.

FIG. 4 is a view showing how the Hall element signals Vh+ and Vh− and the output voltage Vout (pulse) of the reference circuit 6R change between a case where there is no magnet (permanent magnet) near the three-phase AC motor M and a case where there is a magnet. If the magnet is absent near the three-phase AC motor M, Hall element signals Vh+ and Vh− of sine waves in which cross points with the reference voltage VR are present at constant intervals are generated in accordance with the rotation of a rotor magnet, thereby obtaining a pulse waveform having the output voltage Vout of the reference circuit 6R with a 50% duty.

On the other hand, if the magnet is present near the three-phase AC motor M, cross points of the Hall element signals Vh+ and Vh− with the reference voltage VR are not present at constant intervals in accordance with the rotation of the rotor magnet due to an offset component caused by the corresponding magnetic field, and thus, the output voltage Vout of the reference circuit 6R does not have a pulse waveform with a 50% duty.

Figure 5:
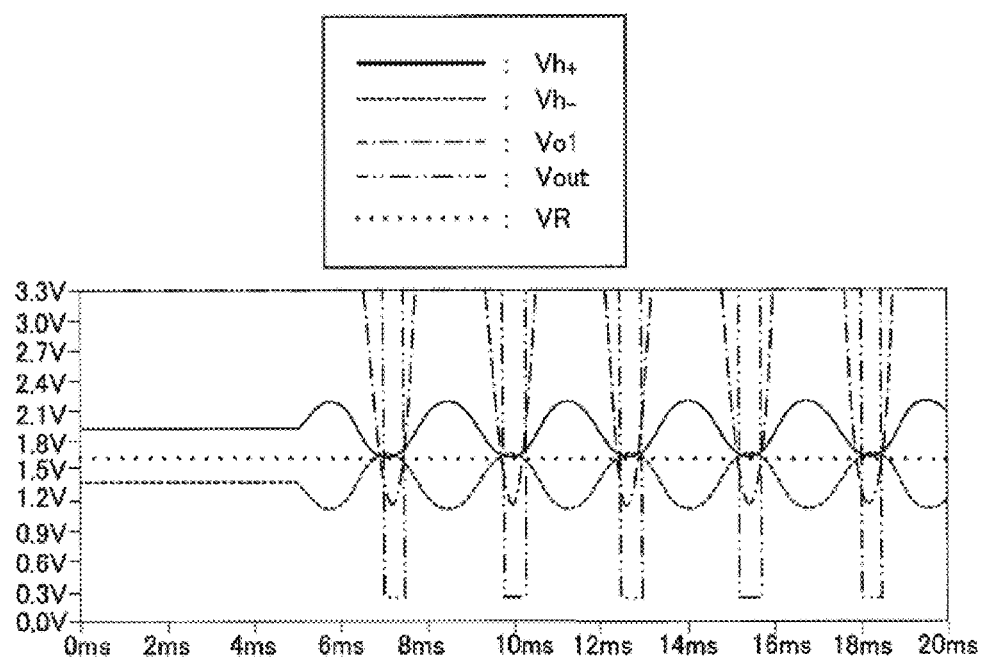
FIG. 5 is a timing chart showing the operation of the reference circuit when the external magnetic field is present.

For example, FIG. 5 shows a waveform in a case where that an amplitude of the Hall element signal in the reference circuit 6R is 0.6 Vp-p, a gain of the signal amplifier 60 is five times, and a component generated by an external magnetic field of 0.5 V (DC) is superimposed on the Hall element signal. As shown in FIG. 5, the interval between cross points of the Hall element signals Vh+ and Vh− is not constant due to the external magnetic field, and the duty ratio deviates from 50%.

Next, the arrangement of the Hall elements and the signal processing circuit 6A of the present embodiment will be described with reference to FIGS. 6A to 10C.

Figure 6A:
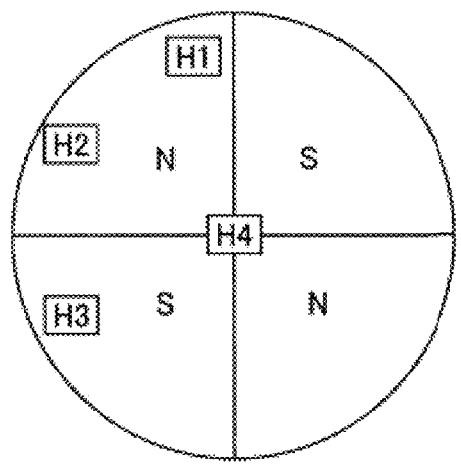
FIGS. 6A and 6B are views showing the arrangement of Hall elements of the motor drive system according to the first embodiment.
Figure 6B:
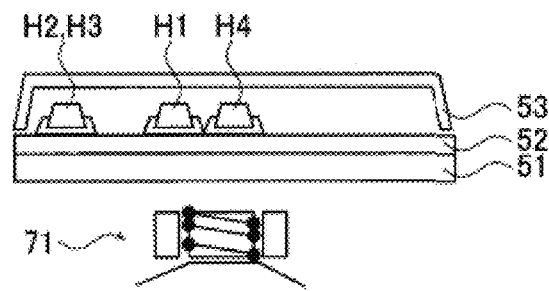
Figure 7:
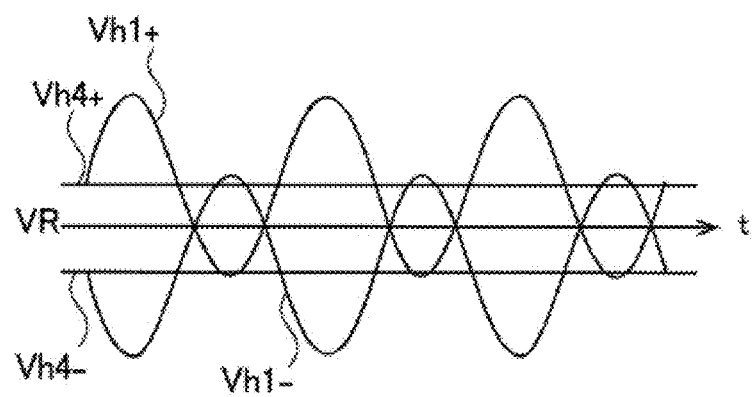
FIG. 7 is a view showing an example of an output waveform of the Hall element according to the first embodiment.
Figure 8:
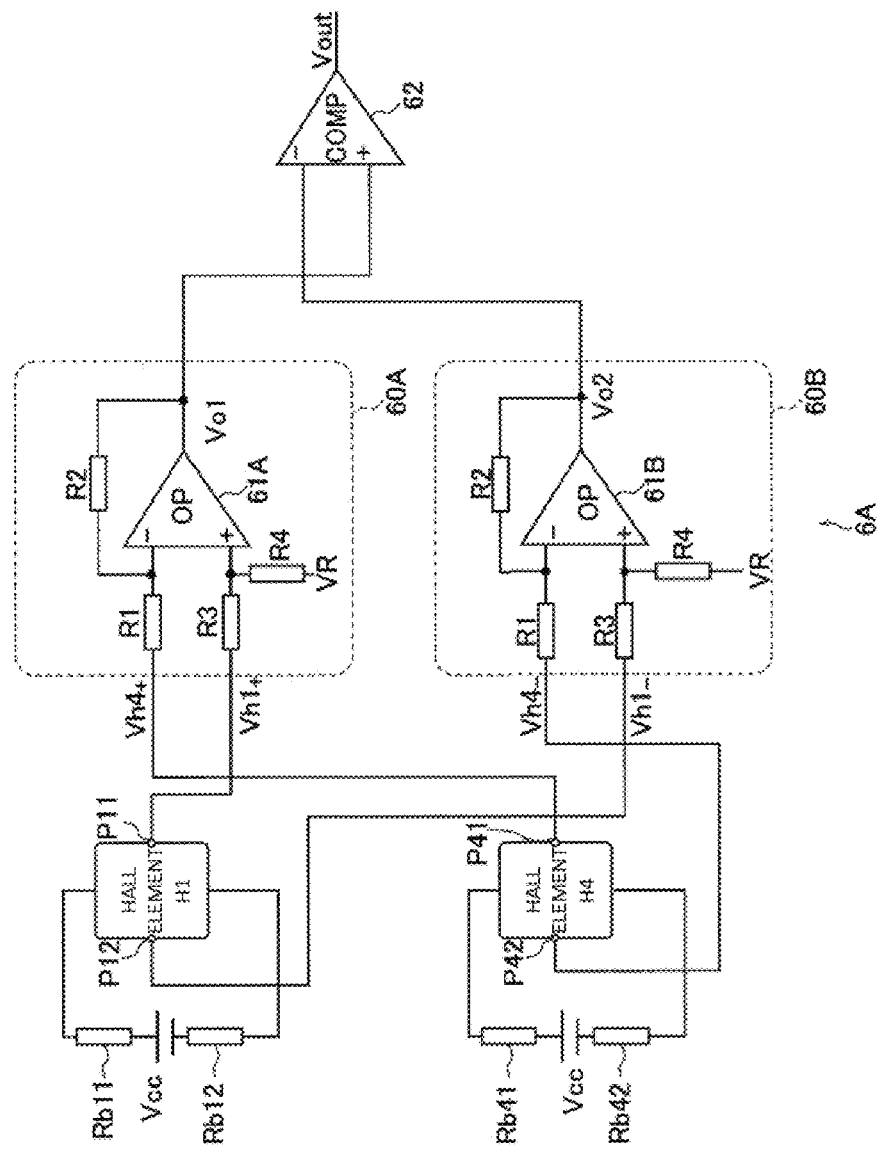
FIG. 8 is a circuit diagram of the signal processing circuit according to the first embodiment.

FIGS. 6A and 6B are views showing the arrangement of Hall elements of the motor drive system 1 according to the present embodiment. FIG. 7 is a view showing a simulation result of an output waveform of the Hall element in the present embodiment. FIG. 8 is a circuit diagram of the signal processing circuit 6A of the present embodiment. Each of FIGS. 9A to 10C is a timing chart showing the operation of the signal processing circuit 6A of the present embodiment.

FIG. 6A is the view showing the arrangement of the respective Hall elements H on a plane orthogonal to a rotation axis of the motor. FIG. 6B is a schematic cross-sectional view of the motor.

In view of the above-described problem of the reference circuit 6R, the signal processing circuit 6A of the present embodiment is configured to cancel an offset component caused by an external magnetic field even when there is a magnetic field other than the detection target outside. Thus, the Hall element H4 for detection of the offset of the external magnetic field is arranged in addition to the three Hall elements H1, H2, and H3 corresponding to the U-phase, V-phase, and W-phase magnetic fields in the present embodiment.

As shown in FIG. 6B, a substrate 52 is arranged on a pedestal 51, and the Hall elements H1 to H4 are provided on the substrate 52, in the three-phase AC motor M of the present embodiment. The substrate 52 is circular, and the rotor magnet is arranged so as to cover the substrate 52. Note that FIG. 6B shows a speaker 71 as an example of the external magnetic field.

In the example shown in FIG. 6A, the number of poles of the three-phase AC motor M is four (that is, the number of pole pairs is two). In this case, the Hall elements H1 to H3 generate the signals mutually having the phase difference of 120 degrees ($\frac{2}{3}\pi$) (in electric angle), and thus, the respective Hall elements are arranged to be shifted each by 60 degrees ($\pi/3$) based on the relationship of electric angle=mechanical angle×number of pole pairs.

The Hall element H4 is arranged at the rotation center of the rotor, and is not affected by the magnetic field accompanying the rotation of the motor.

The principle of signal processing of the signal processing circuit 6A of the present embodiment will be described below with reference to FIG. 7. FIG. 7 shows Hall element signals Vh1+ and Vh1− of the Hall element H1 corresponding to the U phase, and Hall element signals Vh4+ and Vh4−, which are external magnetic field components, of the Hall element H4. As shown in FIG. 7, the Hall element signals Vh1+ and Vh1− of the Hall element H1 have waveforms where the Hall element signals Vh4+ and Vh4− are superimposed due to the influence of the external magnetic field. Therefore, in the signal processing circuit 6A, a difference between the Hall element signal Vh4− and the Hall element signal Vh1− is obtained together with a difference between the Hall element signal Vh4+ and the Hall element signal Vh1+ in order to remove the influence of the external magnetic field. Then, the obtained differences are amplified and binarized so that pulse waveforms excluding the influence of the external magnetic field can be generated.

Note that the influence of the external magnetic field can be excluded by similarly obtaining a difference with a Hall element signal of the Hall element H4 for Hall element signals of the V phase and the W phase.

The signal processing circuit 6A based on the principle of signal processing, which has been described with reference to FIG. 7, will be described with reference to FIG. 8. Although the signal processing circuit 6A shown in FIG. 8 shows only the signal processing of the Hall element signal of the Hall element H1 corresponding to the U phase, the same applies to the signal processing for the Hall element signals of the Hall elements H2 and H3 respectively corresponding to the V phase and the W phase.

As shown in FIG. 8, the signal processing circuit 6A is provided with resistors Rb11 and Rb12 for the power supply voltage Vcc of the Hall element H1 and resistors Rb41 and Rb42 for the power supply voltage Vcc of the Hall element H4 in order to generate a predetermined bias voltage or bias current.

The pair of complementary signals, that is, the Hall element signal Vh1+ and the Hall element signal Vh1− are output from output terminals P11 and P12 of the Hall element H1, respectively. The Hall element signal Vh1+ and the Hall element signal Vh1− are sine wave signals having phases opposite to each other with respect to the reference voltage VR (that is, signals having different polarities with respect to the reference voltage VR).

Similarly, the pair of complementary signals, that is, the Hall element signal Vh4+ and the Hall element signal Vh4− are output from output terminals P41 and P42 of the Hall element H4, respectively. The Hall element signal Vh4+ and the Hall element signal Vh4− are sine wave signals having phases opposite to each other with respect to the reference voltage VR (that is, signals having different polarities with respect to the reference voltage VR).

In the example of the present embodiment, the reference voltage VR is a voltage of a half level of the power supply voltage Vcc.

The signal processing circuit 6A includes signal amplifiers 60A and 60B and the comparator 62. The signal amplifier 60A includes a differential amplifier 61A and the resistors R1 to R4. The signal amplifier 60B includes a differential amplifier 61B and the resistors R1 to R4.

The differential amplifier 61A is a differential amplifier, amplifies the difference between the signal Vh1+ of the Hall element H1 and the signal Vh4+ of the Hall element H4, and outputs a signal of the voltage Vo1. The resistor R1 is provided between the output terminal P41 of the Hall element H4 and an inverting input terminal of the differential amplifier 61A, and the resistor R3 is provided between the output terminal P11 of the Hall element H1 and a non-inverting input terminal of the differential amplifier 61A.

The feedback resistor R2 is provided between the inverting input terminal and an output terminal of the differential amplifier 61A. One end of the resistor R4 is connected to the non-inverting input terminal of the differential amplifier 61A, and the other end of the resistor R4 is set to the reference voltage VR.

Typically, the signal amplifier 60A is set such that R2/R1=R4/R3, and this value becomes an amplification factor (gain) of the signal amplifier 60A.

The differential amplifier 61B is a differential amplifier, amplifies the difference between the signal Vh1− of the Hall element H1 and the signal Vh4− of the Hall element H4, and outputs a signal of a voltage Vo2. The resistor R1 is provided between the output terminal P42 of the Hall element H4 and an inverting input terminal of the differential amplifier 61B, and the resistor R3 is provided between the output terminal P12 of the Hall element H1 and a non-inverting input terminal of the differential amplifier 61B.

The feedback resistor R2 is provided between the inverting input terminal and an output terminal of the differential amplifier 61B. One end of the resistor R4 is connected to the non-inverting input terminal of the differential amplifier 61B, and the other end of the resistor R4 is set to the reference voltage VR.

Typically, the signal amplifier 60B is set such that R2/R1=R4/R3, and this value becomes an amplification factor (gain) of the signal amplifier 60B.

The comparator 62 compares the signal (output voltage Vo1) amplified and output by the signal amplifier 60A and the signal (output voltage Vo2) amplified and output by the signal amplifier 60B, and outputs a binary pulse signal (output voltage Vout) indicating a result of the comparison. This pulse signal is supplied to the CPU 5.

Although the circuit example shown in FIG. 8 shows the case where the signal Vh1+ and the signal Vh1− of the Hall element H1 are input to the non-inverting input terminal, and the signal Vh4+ and the signal Vh4− of the Hall element H4 are input to the inverting input terminal, the present disclosure is not limited thereto. Conversely, the signal Vh1+ and the signal Vh1− of the Hall element H1 may be input to the inverting input terminal, and the signal Vh4+ and the signal Vh4− of the Hall element H4 may be input to the non-inverting input terminal. In such a case, the output signals Vo1 and Vo2 of the signal amplifiers 60A and 60B have opposite phases to those in the case of FIG. 8, and the output voltage Vout of the comparator 62 also has the opposite phase to that in the case of FIG. 8.

Figure 9A:
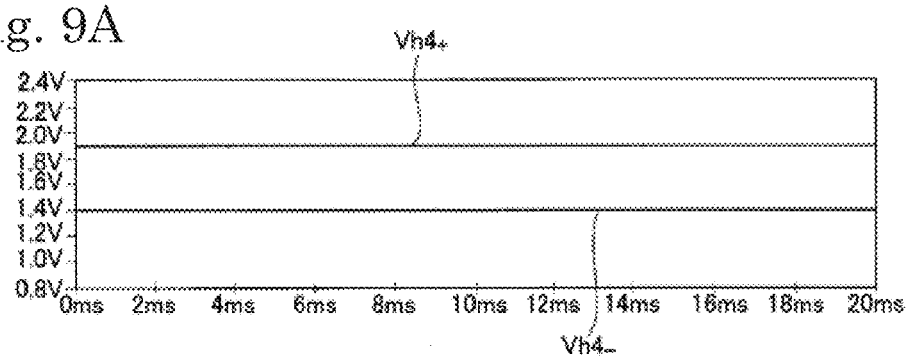
FIGS. 9A to 9C are timing charts showing the operation of the signal processing circuit according to the first embodiment.
Figure 9B:
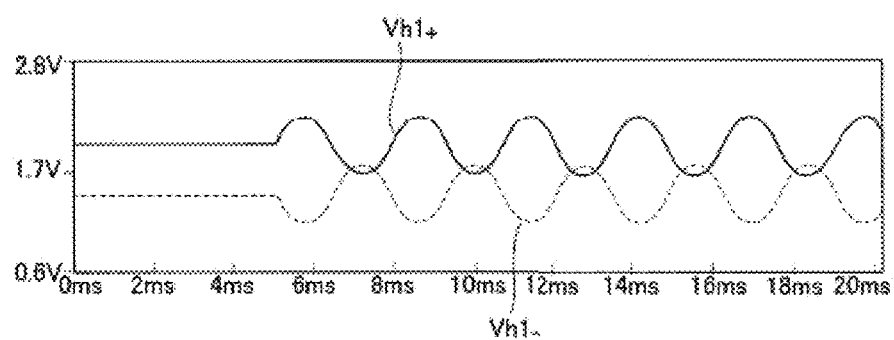
Figure 9C:
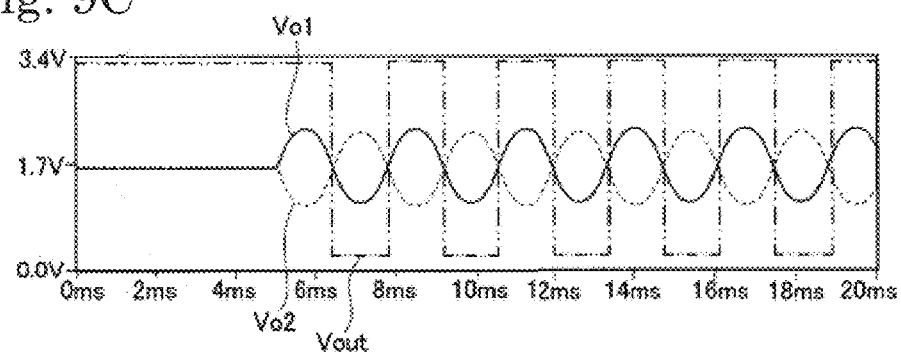
Figure 10A:
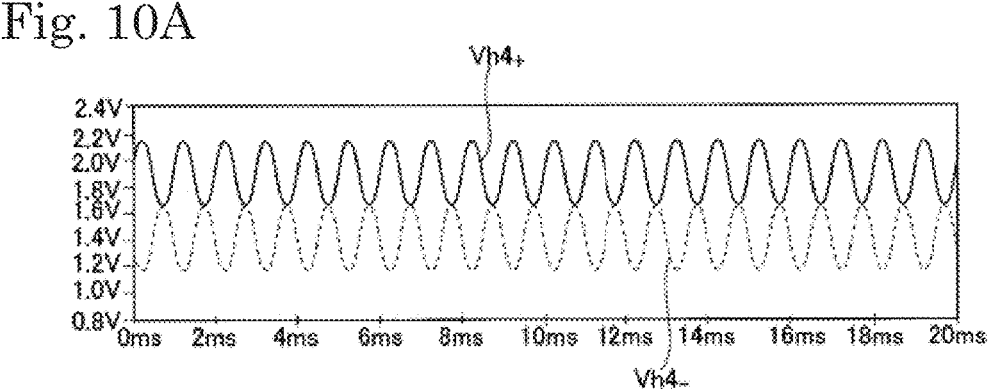
FIGS. 10A to 10C are timing charts showing the operation of the signal processing circuit according to the first embodiment.
Figure 10B:
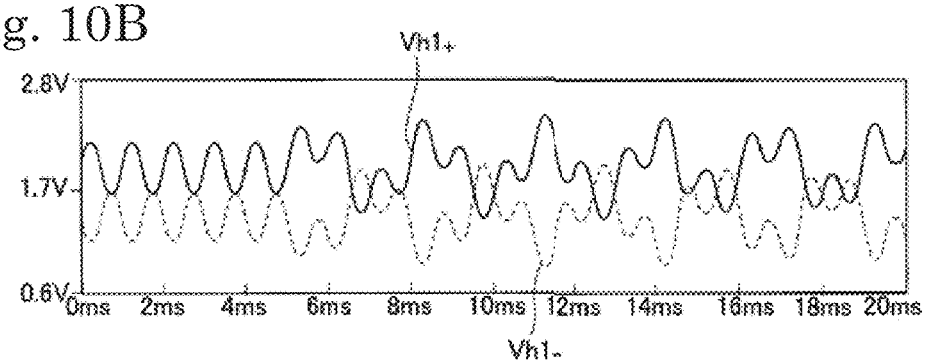
Figure 10C:
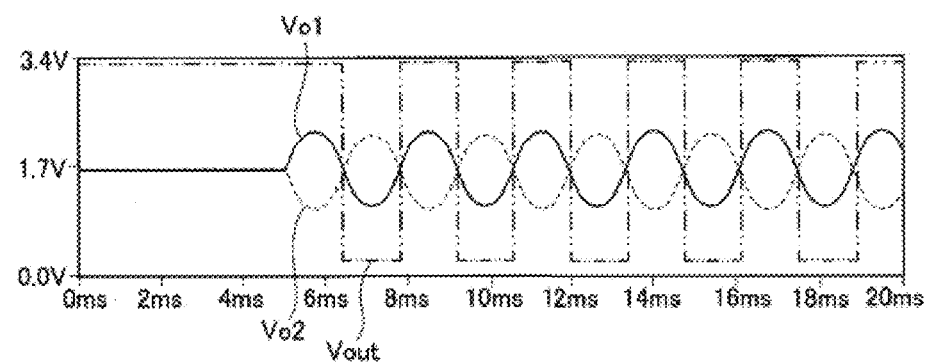

FIGS. 9A to 9C show a case where 0.5 V (see FIG. 9A) is superimposed on each Hall element signal by the external magnetic field, and FIGS. 10A to 10C show a case where a signal with an amplitude 0.5 V(p-p) and 1 kHz is superimposed on each Hall element signal by the external magnetic field.

FIGS. 9A and 10A show the signals Vh4+ and Vh4− of the Hall element H4, and show the signal levels caused only by the external magnetic field. FIGS. 9B and 10B show the signals Vh1+ and Vh1− of the Hall element H1 on which the signal caused by the external magnetic field is superimposed.

As shown in FIGS. 9C and 10C, it is understood that a signal component of the external magnetic field has been removed and a duty ratio of the output voltage Vout has become 50% in both the case where the signal of the external magnetic field has only a DC component (FIG. 9C) and the case where the signal of the external magnetic field has a frequency component (FIG. 10C).

As described above, the motor drive system 1 of the present embodiment is provided with the Hall elements H1 to H3 (examples of a first magnetic sensor) that detect the rotational position of the rotor and the Hall element H4 (an example of a second magnetic sensor) arranged at the rotation center of the rotor. The signal amplifiers 60A and 60B amplify the differences between, for example, the Hall element signals Vh1+ and Vh1− (examples of a first signal) of the Hall element H1 and the Hall element signals Vh4+ and Vh4− (examples of second signal) of the Hall element H4, respectively. The comparator 62 converts the output signals Vo1 and Vo2 of the signal amplifiers 60A and 60B into the output voltage Vout which is the pulse signal. Therefore, even if a noise signal level caused by the external magnetic field is DC or has a frequency component, the noise can be removed.

Next, a motor drive system according to a second embodiment will be described with reference to FIGS. 11 to 13E.

Only a signal processing circuit is different from the motor drive system 1 of the first embodiment in a motor drive system according to each of the following embodiments, and thus, only the signal processing circuit will be described.

Figure 11:
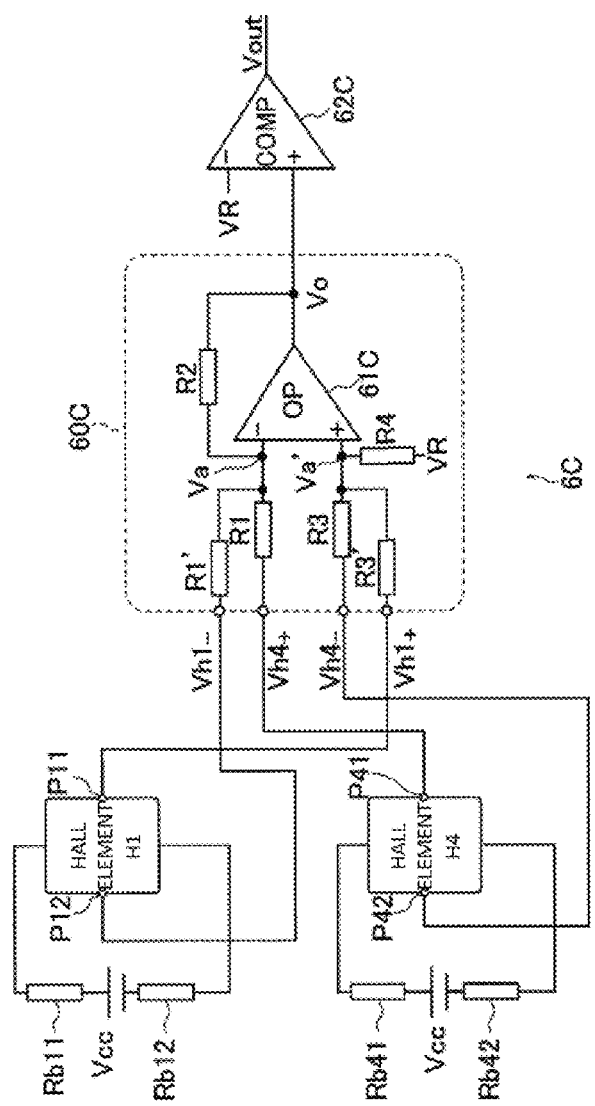
FIG. 11 is a circuit diagram of a signal processing circuit according to a second embodiment.
Figure 12:
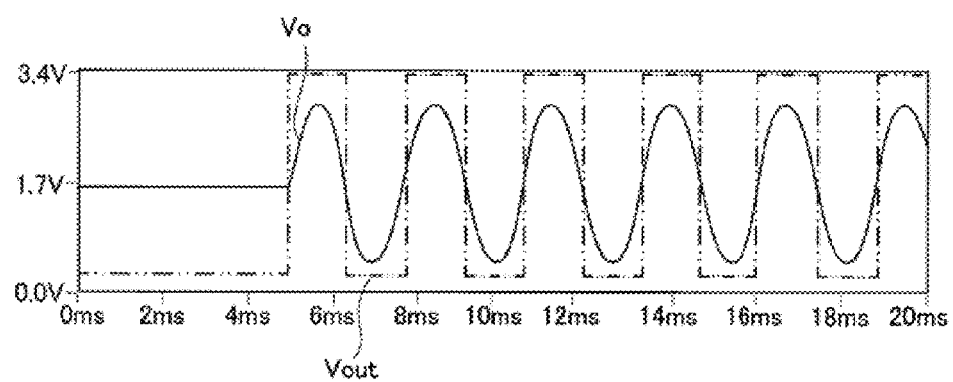
FIG. 12 is a timing chart showing the operation of the signal processing circuit of the second embodiment.

FIG. 11 is a circuit diagram of a signal amplifier 60C of the present embodiment. Each of FIGS. 12 to 13E is a timing chart showing the operation of the signal amplifier 60C of the present embodiment.

As understood by comparing FIG. 11 with FIG. 8, the signal amplifier 60C of the present embodiment is configured using a circuit in which the number of differential amplifiers is reduced from two to one.

More specifically, the Hall element signal Vh1− of the Hall element H1 and the Hall element signal Vh4+ of the Hall element H4 are input in parallel to an inverting input terminal (an example of a first input terminal) of a differential amplifier 61C of the signal amplifier 60C via resistors R1' and R1. The Hall element signal Vh1+ of the Hall element H1 and the Hall element signal Vh4− of the Hall element H4 are input in parallel to a non-inverting input terminal (an example of a second input terminal) of the differential amplifier 61C via resistors R3' and R3. The differential amplifier 61C amplifies a difference between these inputs at a predetermined amplification factor based on the reference voltage VR. The feedback resistor R2 is provided between an output terminal and the inverting input terminal of the differential amplifier 61C.

In the present embodiment, the Hall element signal Vh1+ of the Hall element H1 is an example of a signal having a first polarity out of the first signal, and the Hall element signal Vh1− of the Hall element H1 is an example of a signal having a second polarity out of the first signal. In addition, the Hall element signal Vh4+ of the Hall element H4 is an example of a signal having the first polarity out of the second signal, and the Hall element signal Vh4− of the Hall element H4 is an example of a signal having the second polarity out of the second signal.

In FIG. 11, typically, R1=R1'=R3=R3'. In such a case, the amplification factor (gain) of the signal amplifier 60C is R2/R1 (=R4/R3).

The comparator 62C of the present embodiment outputs the pulse signal (output voltage Vout) based on the comparison result between the output signal Vo of the differential amplifier 61C and the reference voltage VR.

The signal processing circuit 6C shown in FIG. 11 is substantially equivalent to the signal processing circuit 6A shown in FIG. 8. This point will be described hereinafter.

When a voltage at the non-inverting input terminal of the differential amplifier 61C is Va' and a voltage at the inverting input terminal is Va, the following Equations (1) and (2) are established.

[Equation 1]
$$\frac{Va' - VR}{R4} = \frac{Vh4_- - Va'}{R3} + \frac{Vh1_+ - Va'}{R3'} \quad (1)$$

[Equation 2]
$$\frac{Va - Vo}{R2} = \frac{Vh1_- - Va}{R1'} + \frac{Vh4_+ - Va}{R1} \quad (2)$$

Here, when R1=R1'=R3=R3'=R and R2=R4=kR (k: gain), Equations (1) and (2) are expressed as Equations (3) and (4), respectively.

[Equation 3]
$$Va' = \frac{k}{1+2k}(Vh1_+ + Vh4_-) + \frac{1}{1+2k}VR \quad (3)$$

[Equation 4]
$$Va = \frac{k}{1+2k}(Vh1_- + Vh4_+) + \frac{1}{1+2k}Vo \quad (4)$$

Since Va=Va' using an imaginary short, the following Equation (5) is obtained from Equations (3) and (4).

$$Vo=k(Vh4_- - Vh4_+ + Vh1_+ - Vh1_-)+VR \quad [\text{Equation 5}]$$

Therefore, the comparison result obtained by the comparator 62C is expressed by the following Equation (6).

[Equation 6]
$$Vo-VR=k(Vh4_- - Vh4_+ + Vh1_+ - Vh1_-) \quad (6)$$

On the other hand, in the signal processing circuit 6A of FIG. 8, the following Equations (7) and (8) are established for each of the signal amplifiers 60A and 60B.

[Equation 7]
$$Vo1=k(Vh1_+ - Vh4_+)+VR \quad (7)$$

[Equation 8]
$$Vo2=k(Vh1_- - Vh4_-)+VR \quad (8)$$

Therefore, the comparison result obtained by the comparator 62 is expressed by the following Equation (9).

[Equation 9]
$$Vo1-Vo2=k(Vh4_- - Vh4_+ + Vh1_+ - Vh1_-) \quad (9)$$

As shown in Equations (6) and (9), it is understood that the signal processing circuit 6C of the present embodiment is equivalent to the signal processing circuit 6A of FIG. 8.

FIG. 12 is a timing chart (simulation result) showing a level of the output signal Vo of the differential amplifier 61C and the output voltage Vout of the comparator 62 under a condition that the same external magnetic field as that in FIG. 10A is generated, and it has been confirmed that a waveform with a duty ratio of 50% is obtained similarly to FIG. 10C.

Figure 13A:
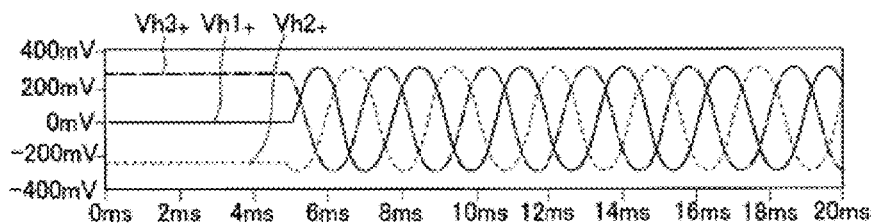
FIGS. 13A to 13E are timing charts showing the operation of the signal processing circuit according to the second embodiment.
Figure 13B:
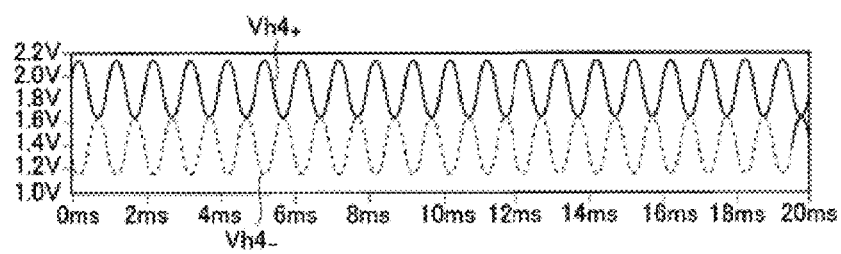
Figure 13C:
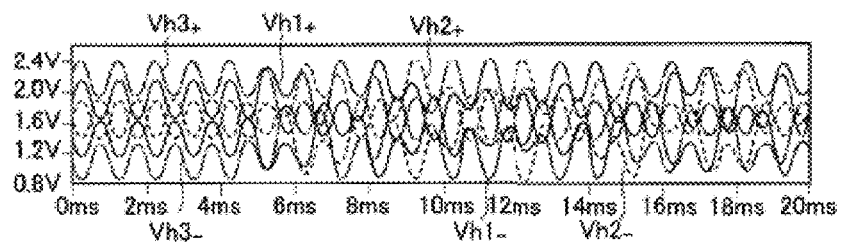
Figure 13D:
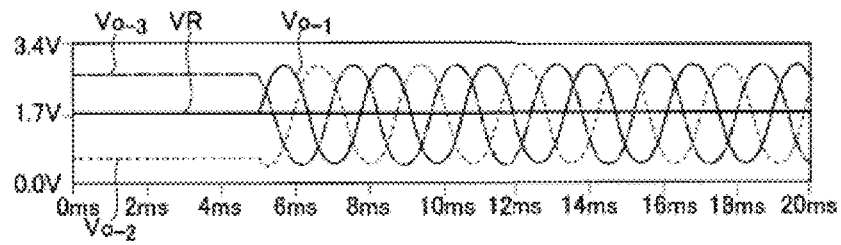
Figure 13E:
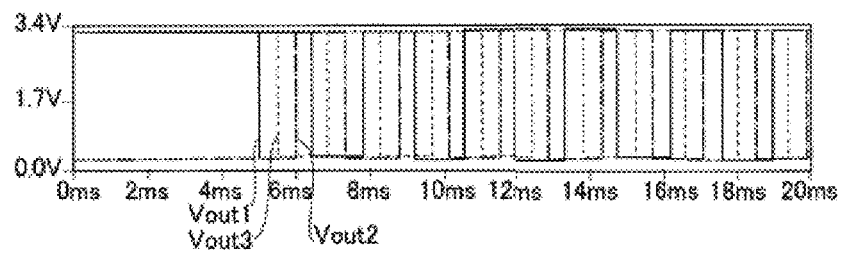

FIGS. 13A to 13E show timing charts (simulation results) based on simulation results when the signal processing circuit 6C of the present embodiment is applied to all of the U, V, and W phases. FIG. 13A shows waveforms of the Hall element signals Vh1+, Vh2+, and Vh3+ of Hall elements H1, H2, and H3, the signal waveforms each having only the signal component from the rotor magnet (that is, having no component of the external magnetic field). FIG. 13B shows signal waveforms of the Hall element signals Vh4+ and Vh4− of the Hall element H4, and has only the component of the external magnetic field. FIG. 13C shows waveforms of the Hall element signals Vh1+, Vh1−, Vh2+, Vh2−, Vh3+, and Vh3− of the Hall elements H1, H2, and H3 on which the component caused by the external magnetic field has been superimposed. FIG. 13D shows output signals Vo-1 (U-phase; same as Vo in FIG. 11), Vo-2 (V-phase), and Vo-3 (W-phase) of the signal amplifier 60C corresponding to the respective phases. FIG. 13E shows waveforms of output voltages Vout1 (U-phase; same as Vout in FIG. 11), Vout2 (V-phase), and Vout3 (W-phase) of the signal processing circuit 6C corresponding to the respective phases.

As shown in FIGS. 13D and 13E, it has been confirmed that the respective phases were shifted by 120 degrees from each other and the duty ratio of 50% was obtained in the output voltages of the respective phases.

As described above, the embodiments of the motor according to the present disclosure have been described in detail. However, a scope of the present disclosure is not limited to the above embodiments. In addition, the above-described embodiments can be variously improved or changed within the scope not departing from a gist of the present disclosure. The technical matters described in each of the plurality of embodiments can be appropriately combined.

For example, the case where the on/off control of each driving MOS transistor of the three-phase voltage generation unit 10 is performed by 120-degree energization based on position information of a Hall sensor has been described in the above-described embodiments, but the disclosure is not limited thereto. As an on/off control method of each driving MOS transistor, another energization control method such as 180-degree energization may be applied.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor, comprising:
a first magnetic sensor that detects a rotational position of a rotor;
a second magnetic sensor arranged at a rotation center of the rotor;
a signal amplifier that amplifies a difference between a first signal, which is a signal output from the first magnetic sensor, and a second signal which is a signal output from the second magnetic sensor; and
a pulse signal generation unit that converts an output signal of the signal amplifier into a pulse signal,
wherein
the first signal has a pair of signals having different polarities with respect to a reference voltage,
the second signal has a pair of signals having different polarities with respect to the reference voltage,
the signal amplifier comprises:
a first differential amplifier that receives a signal having a first polarity out of the first signal and a signal having the first polarity out of the second signal as differential input signals and performs amplification at a predetermined amplification factor based on the reference voltage; and
a second differential amplifier that receives a signal having a second polarity out of the first signal and a signal having the second polarity out of the second signal as differential input signals and performs amplification at a predetermined amplification factor based on the reference voltage,
the pulse signal generation unit generates the pulse signal based on a comparison result of an output signal of the first differential amplifier and an output signal of the second differential amplifier, and
the second magnetic sensor arranged at the rotation center of the rotor is configured to detect a component generated by an external magnetic field, without the second magnetic sensor being affected by a magnetic field accompanying a rotation of the motor.

2. A motor, comprising:
a first magnetic sensor that detects a rotational position of a rotor;
a second magnetic sensor arranged at a rotation center of the rotor;
a signal amplifier that amplifies a difference between a first signal, which is a signal output from the first magnetic sensor, and a second signal which is a signal output from the second magnetic sensor; and
a pulse signal generation unit that converts an output signal of the signal amplifier into a pulse signal,
wherein
the first signal has a pair of signals having different polarities with respect to a reference voltage,
the second signal has a pair of signals having different polarities with respect to the reference voltage,
the signal amplifier comprises a differential amplifier that includes: a first input terminal to which a signal having a second polarity out of the first signal and a signal having a first polarity out of the second signal are input in parallel; and a second input terminal to which a signal having the first polarity out of the first signal and a signal having the second polarity out of the second signal are input in parallel, and performs amplification at a predetermined amplification factor based on the reference voltage,
the pulse signal generation unit generates the pulse signal based on a comparison result between an output signal of the differential amplifier and the reference voltage, and
the second magnetic sensor arranged at the rotation center of the rotor is configured to detect a component generated by an external magnetic field, without the second magnetic sensor being affected by a magnetic field accompanying a rotation of the motor.

* * * * *